Feb. 2, 1926.
W. B. NEWKIRK
1,571,212
METHOD OF MAKING GRAPE SUGAR
Original Filed Nov. 16, 1922
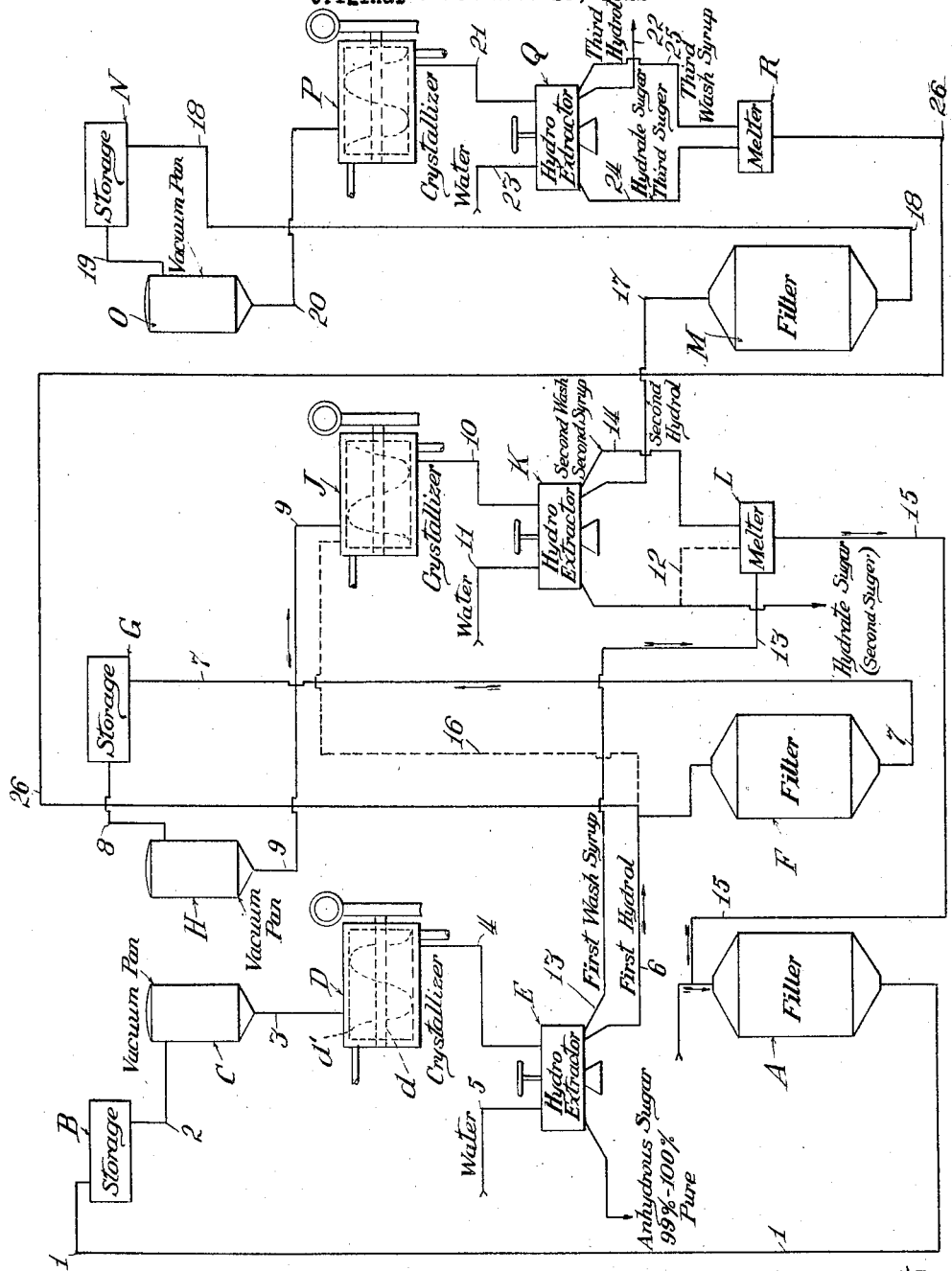
Inventor
William B. Newkirk
By Barneth Jillman
Attorneys Patented Feb. 2, 1926.

1,571,212

UNITED STATES PATENT OFFICE.

WILLIAM B. NEWKIRK, OF RIVERSIDE, ILLINOIS, ASSIGNOR, BY MESNE ASSIGNMENTS, TO INTERNATIONAL PATENTS DEVELOPMENT COMPANY, A CORPORATION OF DELAWARE.

METHOD OF MAKING GRAPE SUGAR.

Original application filed November 16, 1922, Serial No. 601,302. Divided and this application filed May 28, 1923. Serial No. 641,886.

*To all whom it may concern:*

Be it known that I, WILLIAM B. NEWKIRK, a citizen of the United States, residing at Riverside, in the county of Cook and State of Illinois, have invented certain new and useful Improvements in Methods of Making Grape Sugar, of which the following is a specification.

My invention relates to the manufacture of grape sugar from starch, corn starch for example, and the invention has for its object to provide, first, a workable process for making an anhydrous sugar of high purity, and, second, a method of treating the mother liquor extracted from the yield of anhydrous crystals for the production of one or more yields of hydrated sugar.

This application is a division of my copending application Serial No. 601,302, filed November 16, 1922.

Efforts have been made extending over a long period of time, to produce on a commercial scale and by operations economically feasible, pure, white grape sugars of pulverulent or granular character, both of the anhydrous and the hydrated types, but such efforts have heretofore been wholly unsuccessful so far as I am advised, the fact being that the highest grade of grape sugar produced on a commercial scale prior to my invention has contained quite a large proportion of impurities—non-sugars—(4% to 5% at best) besides having a very distinct yellowish or brownish color. Moreover, the methods employed for making as high a grade of sugar as this have been expensive and wasteful, a considerable quantity of the dextrose in the converted liquor being lost with the extracted mother liquor, known as "hydrol", which has very little market value.

The reason for the failure of the previous experimenters to produce a pure grape sugar is due to the lack of appreciation of the conditions necessary in order that, after crystallization has taken place, the mother liquor (uncrystallized dextrose, dextrines and impurities) may be completely extracted, as, for example, by centrifuging from the crystalline dextrose. These conditions are: manipulation of the process for the production of either anhydrous or hydrated crystals, without any substantial quantity of the other type, and to obtain uniformity in size of the crystals of whichever type may be grown in the magma. I have discovered that it is possible, by proper manipulation of the converted liquor during the crystallizing stage, to bring about the growth either of hydrated crystals or of anhydrous crystals without in either case the production of the other type of crystals in any substantial quantities, and that if the right conditions are maintained the crystals of whichever type may be produced will be all of substantially the same size. I have further discovered that if the operation is so controlled as to produce crystallization in this manner it is possible by centrifuging the magma to eliminate all of the mother liquor and thus obtain a yield of sugar which is substantially pure (99% to 100% dextrose, calculated on the basis of dry substances). Unless these conditions are maintained the centrifuging of the magma is not practical or at least will not give uniform results. Success is only occasional and accidental, depending upon a happy change beyond the control of the operator. That is, if conditions are such as to favor in part the induction of one type and in part the other type, the result will be a mass of solids which are not normal purgible crystals of either type.

The present invention relates, in the first place, to the production of anhydrous crystals from the sugar liquor as it comes from the converter. In the second place, the invention contemplates a retreatment of the mother liquor extracted from the anhydrous sugar to obtain an additional or successively additional yields of sugar; but, for reasons which will appear, I do not regard it feasible, or at least desirable, to attempt to obtain anhydrous sugar through these retreating operations. It is better to so manipulate the hydrol extracted from the anhyrdous sugar as to produce a sugar or sugars of the hydrated type. In accordance with the principles of my invention the crystallization will be induced in the hydrol under conditions which insure the production of hydrated crystals and which prevent the growth of anhydrous crystals, just as in the first stage of the process the conditions are controlled to produce anhydrous and not hydrated crystals.

The process of this invention may involve, it will be observed, either a single stage process in which one yield only of sugar (anhydrous sugar) is produced; or a two-stage process involving a treatment of the mother liquor from the first stage for the production of a second yield of sugar (hydrate sugar of relatively high purity); or a three-stage process in which the mother liquor derived from the second crystallizing step is re-treated to obtain a third yield of sugar (preferably hydrated sugar but of a lower purity).

The accompanying drawing is a flow sheet diagram illustrating the thee-stage process and, incidentally, of course, the one and two-stage processes.

Referring to this diagram: the syrup or converted liquor, produced, for example, by the acid hydrolysis of starch in which the conversion is carried as far as practicable, say to 90% dextrose (based on dry substances), is first purified, preferably, by being passed through the bone char filter A and is then run, through pipe 1, to storage tank B. This liquor will ordinarily have a density of approximately 30° Baumé. It is conducted through pipe 2 to vacuum pan C where it is concentrated to a density of from 38° to 45° Baumé. The preferable density is 41° Baumé and, as a matter of fact, the density should be as high as possible so as to shorten the time of crystallization. But if too high the liquor will become so viscous as to become unworkable in the later stages of the process and may have too high a degree of supersaturation causing false grain. The tendency of the liquor to become viscous when concentrated is due to the presence of the dextrine and other impurities. Therefore the extent to which concentration can be carried will depend upon the character of the sugar liquors, their purity, the extent to which conversion has been carried, and the nature of the unconverted or partially converted products therein. From the vacuum pan the concentrated liquor is run through pipe 3 into a crystallizer D which consists, preferably, of a water jacketed vessel having a rotary agitator $d$ therein. The purpose of the agitator is to keep the magma in slow motion during crystallization so that new mother liquor is constantly brought to the growing crystals. Otherwise the crystals as they form will settle to the bottom and the supernatant mother liquor will be likely to throw out false grain. The liquor coming from the vacuum pan will be relatively hot. It may have a temperature approximating 140° Fahrenheit or higher. For the manufacture of anhydrous sugar the liquor should be cooled down to a temperature of from 135° to 110° Fahrenheit and possibly somewhat lower, depending upon its density. With a density of 41° Baumé (this and other densities being based upon a temperature of 100° Fahrenheit as is customary in the art), the preferable temperature is from 115° to 120° Fahrenheit. With a higher or lower density the temperature should be proportionately higher or lower, as the case may be. The liquor is preferably cooled down to the desired temperature by the circulation of cold water through the jacket $d'$ of the crystallizer. The range of temperature favorable for the production of anhydrous sugar is, strictly speaking, between 120° and 135° Fahrenheit. If the temperature is reduced below that range hydrate crystals tend to form. However, after crystallization at a temperature within the anhydrous range has gotten well started, the temperature may be allowed to slide down into the hydrate range, as low, for example, as 95° Fahrenheit, and this is desirable in order to obtain as high a yield as possible since the lower the temperature, the higher will be the yield. However 110° Fahrenheit is under ordinary circumstances about as low a temperature as is practical. This reduction of temperature into the hydrate range can be safely accomplished toward the end of the crystallizing operation without contamination of the anhydrous sugar with hydrate crystals because after the growth of the anhydrous crystals has gotten a good start throughout the entire batch the dextrose will continue to crystallize in that form even if the temperature be low enough so as to be in itself favorable to the formation of hydrate rather than anhydrous crystals.

When the converted liquor is introduced into the crystallizer it is seeded with crystals of the anhydrous type. The seeding of the liquor with crystals of the type of sugar to be manufactured, such crystals being conveniently taken from the batch made just previously, has an important bearing in the matter of obtaining uniformity of crystallization throughout the magma. By inducing the crystallization through seeding instead of allowing the crystals to form spontaneously, the crystals will tend to be all of substantially the same size, whereas if crystallization takes place spontaneously the crystals will ordinarily vary quite considerably in size. The gentle agitation of the magma tends to produce the same result, as above set forth.

After the crystallization has taken place, the material is introduced into a centrifugal machine or hydro-extractor E through pipe 4 and the mother liquor or hydrol extracted. The sugar may then be washed by water from pipe 5 and will be found to contain from 99% to 100% dextrose in the form of anhydrous crystals.

The mother liquor from the hydro-extractor E (first hydrol) is then preferably run through pipe 6 to the filter F and from there through pipe 7 to the storage tank G, from which it is drawn through pipe 8 into a second vacuum pan H, where it is concentrated to a density of from 38° to 42° Baumé, depending upon its character. The hydrol contains, of course, a smaller dextrose content than the original converted liquor. It may contain, for example, 82% dextrose. Its density has been decreased by extraction of a part of its sugar. The purpose of re-boiling the hydrol in the vacuum pan H is to increase its density. Here again the concentration should be carried for economic reasons, as high as possible but inasmuch as the hydrol will contain a larger percentage of dextrine and other impurities than the original converted liquor and is more viscous, it is not desirable to concentrate the liquor in vacuum pan H to as high a point as the original converted liquor concentrated in vacuum pan C. The concentrated liquor from vacuum pan H is run through pipe 9 to a second crystallizer J, preferably identically like crystallizer D. As stated, a more or less constant ratio should hold as between the temperature at which crystallization is induced and the density of the liquor treated. The anhydrous temperature range is relatively high and consequently if this type of sugar is to be produced economically the density of the liquor treated must be high. Because of the greater viscosity of the hydrol, as compared with the original converted liquor, I do not regard it practical, or at least desirable to attempt to produce an anhydrous sugar from the hydrol in the second stage of the process. The liquor run into the crystallizer J is therefore seeded with hydrate crystals and cooled down quickly through the anhydrous range to a temperature within the hydrate range, preferably to a temperature of from 90° to 100° Fahrenheit, depending upon the density of the liquor, and is held at this temperature until crystallization is complete. The cooling may be effected by running cold water through the water jacket of the crystallizer. It is important to bring about this cooling quickly in order that crystallization should not be initiated while the liquor passes through the anhydrous range. After the desired temperature is reached the batch may be kept at that temperature, or at least within the hydrate range, by the circulation of warm water through the jacket.

After crystallization has proceeded as far as possible the material is run through pipe 10 to a second hydro-extractor K which expels the mother liquor leaving the crystals in the basket. This sugar may be washed with water from pipe 11. I have found it possible, by the exercise of some care, to produce a "second sugar," that is, sugar taken from hydro-extractor K, which will be substantially as pure as sugar from the hydro-extractor E, although as stated, it will be hydrate sugar instead of anhydrous sugar. If, however, the second sugar is not of the required purity, which may happen in case the percentage of dextrose in the hydrol is low, or if the non-sugars do not wash out readily, the sugar from hydro-extractor K may be introduced by conveyor 12 into the melter L to which is preferably run, through pipe 13, the wash syrup from hydro-extractor E (first wash syrup) and through pipe 14, the wash syrup from hydro-extractor K (second wash syrup). The melted sugar is conducted through pipe 15 to filter A where it is mixed with the next batch of converted liquor.

In the two-boiling process just described, the hydrol from hydro-extractor K (second hydrol) receives no further treatment. It is a marketable product of some but small value.

The process as above outlined may be modified in the following respect: Instead of filtering and concentrating the first hydrol this liquor may be conducted directly, through pipe 16, indicated by the dotted line on the diagram, to crystallizer J. The liquor being relatively light, crystallization takes place slowly which is a disadvantage. The modified arrangement has, however, the compensating advantage of eliminating the expense of the filtering and re-boiling steps.

For the three-boiling process the hydrol extracted from hydro-extractor K (second hydrol) is conducted through pipe 17 to the filter M and is then run through pipe 18 to the storage tank N and from the storage tank through pipe 19 to the third vacuum pan O. The liquor is here concentrated as highly as its diminished purity and consequently increased viscosity will permit, ordinarily to a density varying from 36° to 40° Baumé. It is then run through a pipe 20 to the third crystallizer P, like crystallizers D and J, where its temperature is reduced to from 90° to 100° Fahrenheit and held at that point until crystallization is complete. The cooling is again accomplished quickly, so that the liquor remains for as short a time as possible within the anhydrous range of temperatures. The material is then introduced through a pipe 21 into a hydro-extractor Q where the hydrol is spun off, the liquid being carried out of the process through pipe 22 (third hydrol). The sugar in the hydro-extractor is washed by water introduced through pipe 23 and this sugar (third sugar) is carried by conveyor 24 to a melter R into which is introduced through pipe 25 the wash syrup (third wash syrup) from hydro-extractor Q. The melted sugar passes through pipe 26 into the filter F where it mixes with the first hydrol. It is sometimes possible to obtain a third sugar of sufficiently high purity for the market, but ordinarily the third sugar is of a rather low grade as to purity and is returned to the process as described.

The connections between the various elements of the apparatus have been referred to generally as pipes and conveyors. It will be understood that any suitable means may be used for moving the material from vessel to vessel. The invention is not concerned with the particular form of apparatus illustrated diagrammatically in the drawing. It would be possible, for example, to crystallize the concentrated liquor in the vacuum pan but as a matter of practice it is more convenient to employ separate crystallizing vessels as indicated.

It is realized that even with the fullest disclosure of the invention perfectly satisfactory results are obtainable only by the exercise of some discretion on the part of the operator so far as concerns the densities of the liquor in which crystallization is induced and the temperatures at which crystallization takes place. The character of the converted liquor will differ in different plants and even when much care is exercised with different batches in the same establishment. The aim should be to concentrate the liquor as highly as possible but the degree of workable concentration will depend upon the character of the particular batch. While it is not possible to state to a degree the exact temperatures to be employed for the hydrate and the anhydrous sugars respectively, since such temperatures will depend upon density and density upon the character of the converted liquor, the density and temperature should be regulated within the limits above indicated so as to produce either anhydrous or hydrate crystals, and not a mixture of both. It is of great importance that the conditions should be maintained favorable to the production of one type of crystals and unfavorable to the production of the other type.

It will be apparent from the foregoing considerations that while I have described my invention in what I consider its most desirable form, I realize fully that the preferred method above outlined may be modified without departure from the principles of the invention and will doubtless have to be modified according to varying characteristics of the converted liquor treated. I wish it to be understood, therefore, that the invention is not limited to the specific details of the process as described, except so far as such details are made limitations in the appended claims. By the term "one type" as referring to the sugar produced or used as seed I intend either anhydrous crystals or hydrate crystals to the substantial exclusion of crystals of the other kind.

I claim:

1. Method of obtaining grape sugar from a dextrose and water solution produced by the conversion of starch, which comprises concentrating the solution to supersaturation by heating, cooling the solution and maintaining the same at a temperature favorable to the production of anhydrous crystals, separating the mother liquor from the dextrose crystals, holding the mother liquor at a lower temperature to induce the growth of hydrate crystals, and separating the mother liquor from the second batch of crystals.

2. Method of obtaining grape sugar from a dextrose and water solution produced by the conversion of starch, which comprises concentrating the solution to supersaturation by heating, cooling the solution and maintaining the same at a temperature favorable to the production of anhydrous crystals, separating the mother liquor from the dextrose crystals, concentrating the mother liquor by heating, cooling the same to a temperature favorable to the growth of hydrate crystals, and separating the mother liquor from the second batch of crystals.

3. Method of obtaining grape sugar from a dextrose and water solution produced by the conversion of starch which comprises concentrating the solution to supersaturation by heating, cooling the solution and maintaining the same at a temperature favorable to the production of anhydrous crystals, separating the mother liquor from the dextrose crystals, concentrating the mother liquor by heating, cooling the same quickly through the anhydrous range of temperatures to a temperature within the hydrate range, holding the same at the reduced temperature to induce the growth of a second batch of crystals, and separating the mother liquor from said second batch of crystals.

4. Method of obtaining grape sugar from a dextrose and water solution produced by the conversion of starch which comprises concentrating the solution to supersaturation by heating, cooling the solution and maintaining the same at a temperature favorable to the production of anhydrous crystals in the presence of previously formed crystals of the anhydrous type, separating the mother liquor from the dextrose crystals, holding the mother liquor at a lower temperature in the presence of previously formed hydrate crystals to induce the growth in the liquor of crystals of this type, and separating the mother liquor from the second batch of crystals.

5. Method of obtaining grape sugar from a dextrose and water solution produced by the conversion of starch which comprises concentrating the solution to supersaturation by heating, cooling the solution to a temperature favorable to the production of anhydrous crystals and maintaining the same in motion at such temperature, separating the mother liquor from the dextrose crystals, maintaining the mother liquor in motion at a lower temperature to induce the growth of hydrate crystals, and separating the mother liquor from the second batch of crystals.

6. Method of obtaining grape sugar from a dextrose and water solution produced by the conversion of starch which comprises concentrating the solution to supersaturation by heating, cooling the solution to a temperature favorable to the production of anhydrous crystals and maintaining the same at such temperature in motion and in the presence of previously formed anhydrous crystals, separating the mother liquor from the dextrose crystals, holding the mother liquor at a lower temperature in motion and in the presence of previously formed hydrate crystals to induce the growth of crystals of this type, and separating the mother liquor from the second batch of crystals.

7. The method of obtaining grape sugar from a dextrose and water solution produced by the conversion of starch, which comprises concentrating the solution to supersaturation by heating, cooling the solution to a temperature favorable to the production of anhydrous crystals, maintaining the same at such temperature and in motion in the presence of previously formed anhydrous crystals, separating the mother liquor from the dextrose crystals, concentrating the mother liquor by heating, cooling the same to a temperature favorable to the growth of hydrate crystals, maintaining the same in motion at such temperature and in the presence of previously formed hydrate crystals, and separating the mother liquor from the second batch of crystals.

8. The method of obtaining grape sugar from a dextrose and water solution produced by the conversion of starch, which comprises concentrating the solution to supersaturation by heating, cooling the solution to a temperature favorable to the production of anhydrous crystals, holding the same at such temperature in motion and in the presence of previously formed anhydrous crystals, separating the mother liquor from the dextrose crystals, concentrating the mother liquor by heating, cooling the same quickly through the anhydrous range of temperatures to a temperature within the hydrate range and holding the liquor at the reduced temperature in motion and in the presence of previously formed hydrate crystals to induce the growth of a second batch of crystals, and separating the mother liquor from said second batch of crystals.

9. Method of obtaining grape sugar from a dextrose and water solution produced by the conversion of starch which comprises concentrating the solution to supersaturation by heating, cooling the solution to a temperature favorable to the production of anhydrous crystals, separating the mother liquor from the dextrose crystals, holding the mother liquor under conditions favorable to the production of a second batch of crystals, and separating the mother liquor from said second batch of crystals.

10. Method of obtaining grape sugar from a dextrose and water solution produced by the conversion of starch which comprises concentrating the solution to supersaturation by heating, cooling the solution to a temperature favorable to the production of anhydrous crystals, separating the mother liquor from the dextrose crystals, concentrating the mother liquor by heating, cooling the same to produce a second batch of crystals, and separating the mother liquor from said second batch of crystals.

11. Method of obtaining grape sugar from a dextrose and water solution produced by the conversion of starch which comprises concentrating the solution to supersaturation by heating, cooling the solution to a temperature favorable to the production of anhydrous crystals, maintaining the liquor at such temperature in motion and in the presence of previously formed anhydrous crystals, separating the mother liquor from the dextrose crystals, concentrating the mother liquor by heating, seeding the same with crystals of one type and cooling the liquor to a temperature to produce therein crystals of the same type as the seeding crystals while keeping the solution in motion.

12. Method of obtaining grape sugar from a dextrose and water solution produced by the conversion of starch which comprises concentrating the solution to a density of between 38° and 45° Baumé, cooling the solution to a temperature between 135° and 110° Fahrenheit to induce the growth of anhydrous crystals, separating the mother liquor from the dextrose crystals, holding the mother liquor at a temperature below 110° Fahrenheit to induce the growth of hydrate crystals, and separating the mother liquor from the second bath of crystals.

13. Method of obtaining grape sugar from a dextrose and water solution produced by the conversion of starch which comprises concentrating the solution to a density of between 38° and 45° Baumé, cooling the solution to a temperature between 135° and 110° Fahrenheit to induce the growth of anhydrous crystals, separating the mother liquor from the dextrose crystals, concentrating the mother liquor by heating to a density of from 38° to 42° Baumé, cooling the same to a temperature below 110° Fahrenheit to induce the growth of hydrate crystals, and separating the mother liquor from the second batch of crystals.

14. Method of obtaining grape sugar from a dextrose and water solution produced by conversion of starch, which comprises concentrating the solution to a density of between 38° and 45° Baumé, cooling the solution to a temperature between 135° and 110° Fahrenheit, maintaining the same at such temperature in motion and in the presence of previously formed anhydrous crystals to induce the formation of crystals of this type, separating the mother liquor from the dextrose crystals, concentrating the mother liquor to a density of from 38° to 42° Baumé, cooling the same to a temperature below 110° Fahrenheit and holding the same at such temperature in motion and in the presence of previously formed hydrate crystals to induce the growth of crystals of this type, and separating the mother liquor from the second batch of crystals.

15. The method of obtaining grape sugar from a dextrose and water solution produced by the conversion of starch which comprises concentrating the solution to supersaturation by heating, cooling the solution to a temperature favorable to the production of anhydrous crystals, and maintaining it within the anhydrous range of temperatures until the growth of crystals of this type has been initiated, then reducing the liquor to a lower temperature, separating the mother liquor from the dextrose crystals, holding the mother liquor at a temperature to induce the growth of hydrate crystals, and separating the mother liquor from the second batch of crystals.

16. Method of obtaining grape sugar from a dextrose and water solution produced by the conversion of starch which comprises concentrating the solution to supersaturation by heating, cooling the solution to a temperature favorable to the production of anhydrous crystals, maintaining it within the anhydrous range of temperatures until the growth of crystals of this type has been initiated, then reducing the liquor to a lower temperature, separating the mother liquor from the dextrose crystals, concentrating the mother liquor by heating, cooling the same to produce a second batch of crystals, and separating the mother liquor from said second batch of crystals.

17. Method of obtaining grape sugar from a dextrose and water solution produced by the conversion of starch which comprises concentrating the solution to a density of between 38° and 45° Baumé, cooling the solution to a temperature between 135° and 120° Fahrenheit and holding the same within such range of temperatures in motion and in the presence of previously formed anhydrous crystals until the growth of crystals of the anhydrous type has been initiated, then cooling the liquor to a lower temperature, separating the mother liquor from the dextrose crystals, maintaining the mother liquor at a temperature below 110° Fahrenheit and in motion in the presence of previously formed hydrate crystals, and separating the mother liquor from the second batch of crystals.

18. Method of obtaining grape sugar from a dextrose and water solution produced by the conversion of starch which comprises concentrating the solution to supersaturation at a temperature within the range of temperatures favorable to the production of anhydrous crystals, separating the mother liquor from the crystals so formed and maintaining the mother liquor at a temperature favorable to the formation of hydrate crystals, and separating the mother liquor from said second batch of crystals.

19. Method of obtaining grape sugar from a dextrose and water solution produced by the conversion of starch which comprises concentrating the solution to supersaturation at a temperature within the range of temperatures favorable to the production of anhydrous crystals, separating the mother liquor from the crystals so formed and maintaining the mother liquor at a temperature favorable to the formation of hydrate crystals, and separating the mother liquor from said second batch of crystals, the liquor being maintained during the crystallizing operations in motion and in the presence of crystals of the type to be grown, respectively.

20. Method of obtaining anhydrous grape sugar from a dextrose and water solution produced by the conversion of starch which comprises concentrating the solution to supersaturation by heating, cooling the same to a temperature not substantially below 110° Fahrenheit to induce the growth of crystals of the anhydrous type, and separating the mother liquor from the crystals so formed while the magma is in a fluent condition.

21. The method of obtaining anhydrous grape sugar from a dextrose and water solution produced by the conversion of starch which comprises concentrating the solution to supersaturation by heating, seeding with anhydrous crystals, cooling the solution to a temperature not substantially below 110° Fahrenheit, and separating the mother liquor from the crystals formed therein while the magma is in a fluent condition.

22. Method of obtaining anhydrous grape sugar from a dextrose and water solution produced by the conversion of starch which comprises concentrating the solution to supersaturation by heating, cooling the solution to a temperature not substantially below 110° Fahrenheit, maintaining the solution in motion at such temperature to induce crystallization, and separating the mother liquor from the crystals.

23. Method of obtaining anhydrous grape sugar from a dextrose and water solution produced by the conversion of starch which comprises concentrating the solution to supersaturation by heating, cooling the solution to a temperature not substantially below 110° Fahrenheit, maintaining the solution in motion at such temperature in the presence of previously produced anhydrous crystals to induce crystallization, and separating the mother liquor from the crystals formed therein while the magma is in a fluent condition.

24. Method of obtaining anhydrous grape sugar from a dextrose and water solution produced by the conversion of starch which comprises concentrating the solution to supersaturation by heating, cooling the same to a temperature within the range of temperatures favorable to the growth of anhydrous crystals until crystallization is under way, then reducing the liquor to a lower temperature, and separating the mother liquor from the crystals formed therein while the magma is in a fluent condition.

25. Method of obtaining anhydrous grape sugar from a dextrose and water solution produced by the conversion of starch which comprises concentrating the solution to supersaturation by heating, cooling the same to a temperature within the range of temperatures favorable to the growth of anhydrous crystals until crystallization is under way, then reducing the liquor to a lower temperature, maintaining the liquor in motion in the presence of previously formed anhydrous crystals during the crystallizing operation, and separating the mother liquor from the crystals formed therein while the magma is in a fluent condition.

26. Method of obtaining anhydrous grape sugar from a dextrose and water solution produced by the conversion of starch which consists in concentrating the solution to a density between 38° and 45° Baumé, cooling the same to a temperature between 135° and 110° Fahrenheit to induce crystallization, and separating the mother liquor from the crystals formed therein while the magma is in a fluent condition.

27. Method of obtaining anhydrous grape sugar from a dextrose and water solution produced by the conversion of starch, which consists in concentrating the solution to a density between 38° and 45° Baumé, cooling the same to a temperature between 135° and 110° Fahrenheit, maintaining the solution within such range of temperatures and in motion in the presence of previously formed anhydrous crystals, and separating the mother liquor from the dextrose crystals formed therein while the magma is in a fluent condition.

28. Method of obtaining anhydrous grape sugar from a dextrose and water solution produced by the conversion of starch which consists in maintaining the solution concentrated to supersaturation at a temperature between 110° and 135° Fahrenheit, in motion and in the presence of previously formed anhydrous crystals to induce crystallization, and separating the mother liquor from the dextrose crystals formed therein while the magma is in a fluent condition.

29. Method of obtaining anhydrous grape sugar from a dextrose and water solution produced by the conversion of starch which consists in maintaining the solution concentrated to supersaturation at a temperature between 110° and 135° Fahrenheit until crystallization has been started, then reducing the temperature of the liquor and after crystallization has been completed separating the mother liquor from the crystals while the magma is in a fluent condition.

30. Method of obtaining anhydrous grape sugar from an aqueous dextrose solution produced by the conversion of starch, which comprises concentrating the solution to supersaturation, bringing about crystallization within the range of temperatures favorable to the growth of anhydrous crystals, and then centrifuging the magma, while in a fluent state, to separate the mother liquor from the crystals.

WILLIAM B. NEWKIRK.